Sept. 27, 1932.　　　G. B. REMMEY　　　1,879,494
HIGH TEMPERATURE FURNACE
Filed Feb. 20, 1931　　　3 Sheets-Sheet 1
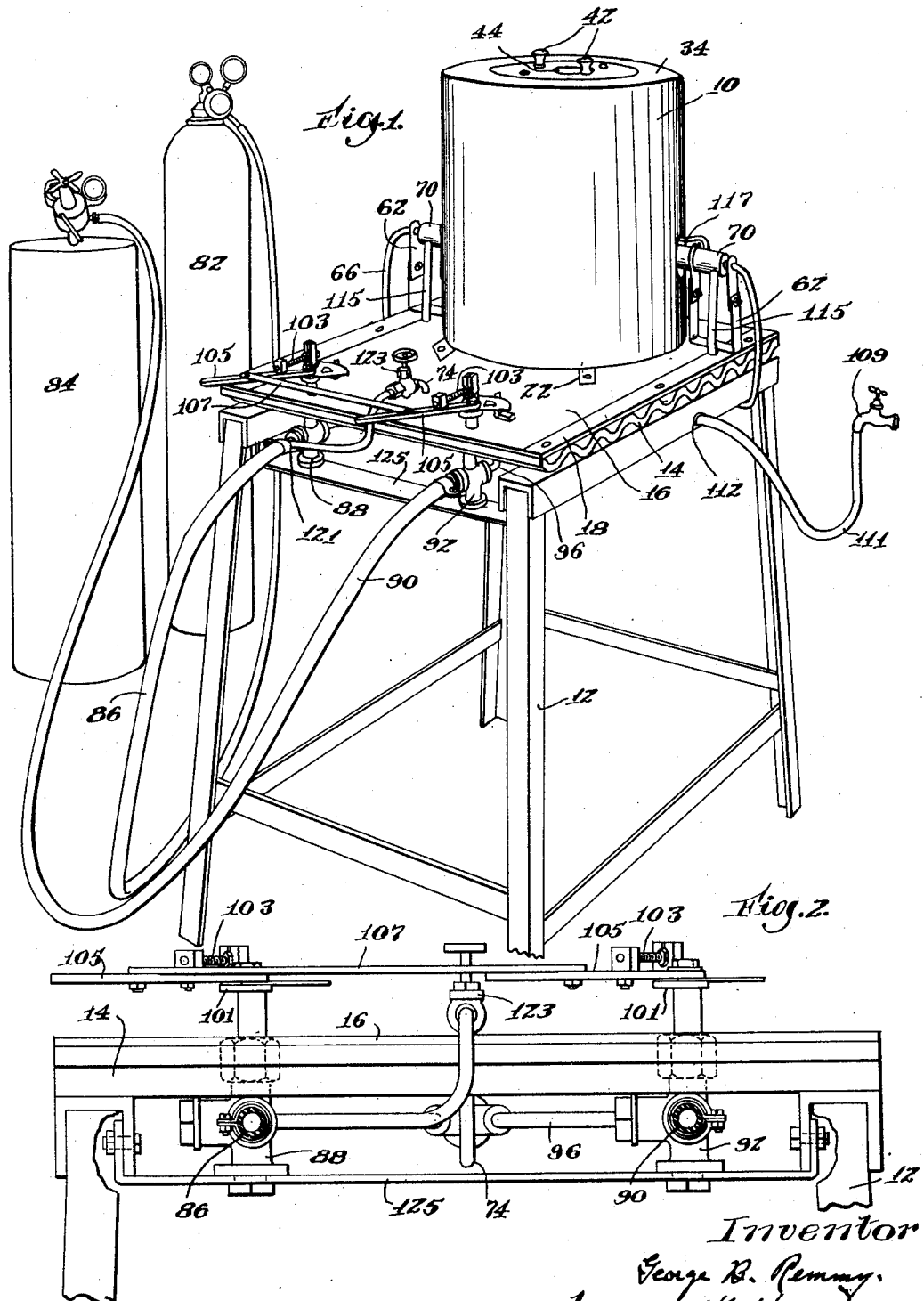

Sept. 27, 1932.  G. B. REMMEY  1,879,494
HIGH TEMPERATURE FURNACE
Filed Feb. 20, 1931  3 Sheets-Sheet 2

Inventor
George B. Remmey
by H. W. Hemmway
Attorney

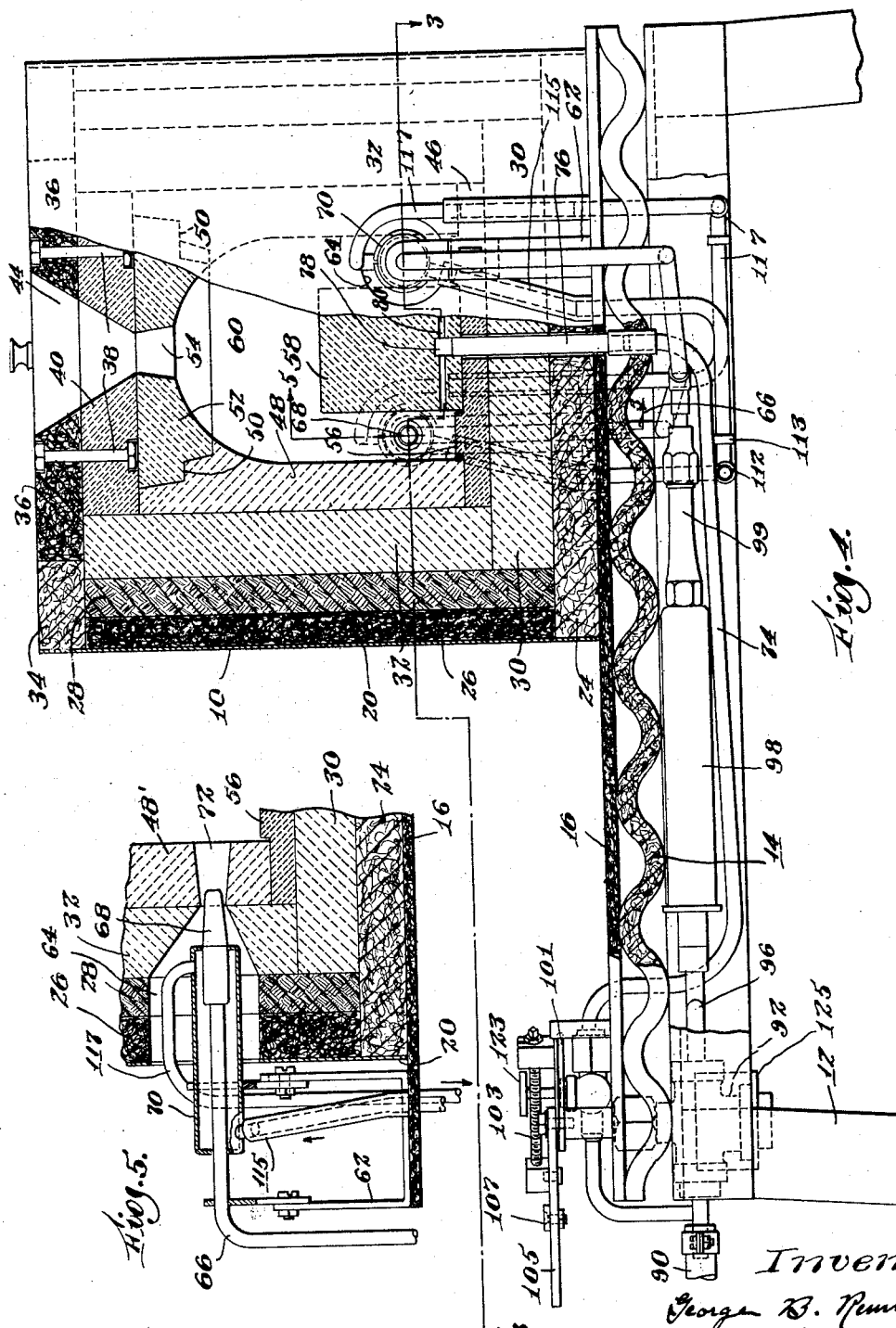

Patented Sept. 27, 1932

1,879,494

UNITED STATES PATENT OFFICE

GEORGE BICKLEY REMMEY, OF PHILADELPHIA, PENNSYLVANIA

HIGH TEMPERATURE FURNACE

Application filed February 20, 1931. Serial No. 517,158.

This invention relates to high temperature furnaces, and more particularly to fusion point test furnaces. It is well known that the progress of research and industry in many lines requires and depends upon accurate melting tests of various materials. The accuracy of results, in turn, aside from the human element, depends largely upon the character of the furnace and manner in which the fuel is used and controlled. The primary object of the present invention is to produce an improved high temperature furnace provided with a melting and testing chamber and so constructed and heated by a high temperature fuel that high fusion point materials may be more easily, economically and quickly melted therein and more accurately tested in respect to their melting point than has been possible heretofore. In using a test furnace embodying my invention, moreover, the element of human dependency is appreciably reduced.

The accuracy of fusion point tests depends on many factors, among which may be mentioned accuracy and uniformity of testing chamber temperature at all degrees of heat, accuracy of atmosphere control within the heating and testing chamber, proper selection of fuel and effective control of same, reliable record of time, etc. In developing the improved furnace of my invention, I have given particular consideration to these and many other requirements. In accordance with my invention, the furnace walls may be constructed relatively thick and of heat insulating materials of progressively greater heat resisting character from outside to inside, respectively. The heating and testing chamber and the fuel conducting units may be constructed and arranged to use a high temperature fuel and to heat the testing chamber compartment with great rapidity, economy and uniformity, and the fuel and oxygen may be so controlled that the atmosphere within the furnace is always uniform and of proper consistency for complete oxidation with highest heat value.

A thoroughly satisfactory high temperature furnace for making melting tests must use a standard fuel since the tests are made in different localities. For this reason and also for the sake of economy and uniformity, I have selected a fuel comprising oxygen and acetylene. Furthermore, each furnace of the type selected and manufactured must function exactly as every other furnace of that type if the tests are to be of any value, and maximum simplicity of operation is highly essential. The construction of my furnace is such as to produce these and other most desirable and essential results. The heating and testing chamber and fuel conduits are arranged to rapidly heat the testing compartment and maintain a uniform temperature in all parts thereof, thus providing for rapid and accurate tests, and the furnace is also provided with vent and sight openings and equipped for easy access to the testing chamber. These and other novel and valuable features, hereinafter more fully described, cooperate to produce a superior high temperature melting furnace for the purposes stated and the production of such a furnace embodying these improvements comprises a further object of my invention.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings,

Fig. 1 is a perspective view of a furnace constructed in accordance with my invention;

Fig. 2 is a sectional view taken on line 2—2 of Fig. 3;

Fig. 4 is a side elevation of the furnace, partially in section; and

Fig. 5 is a fragmentary sectional view taken on line 5—5 of Figs. 3 and 4.

Figure 3:
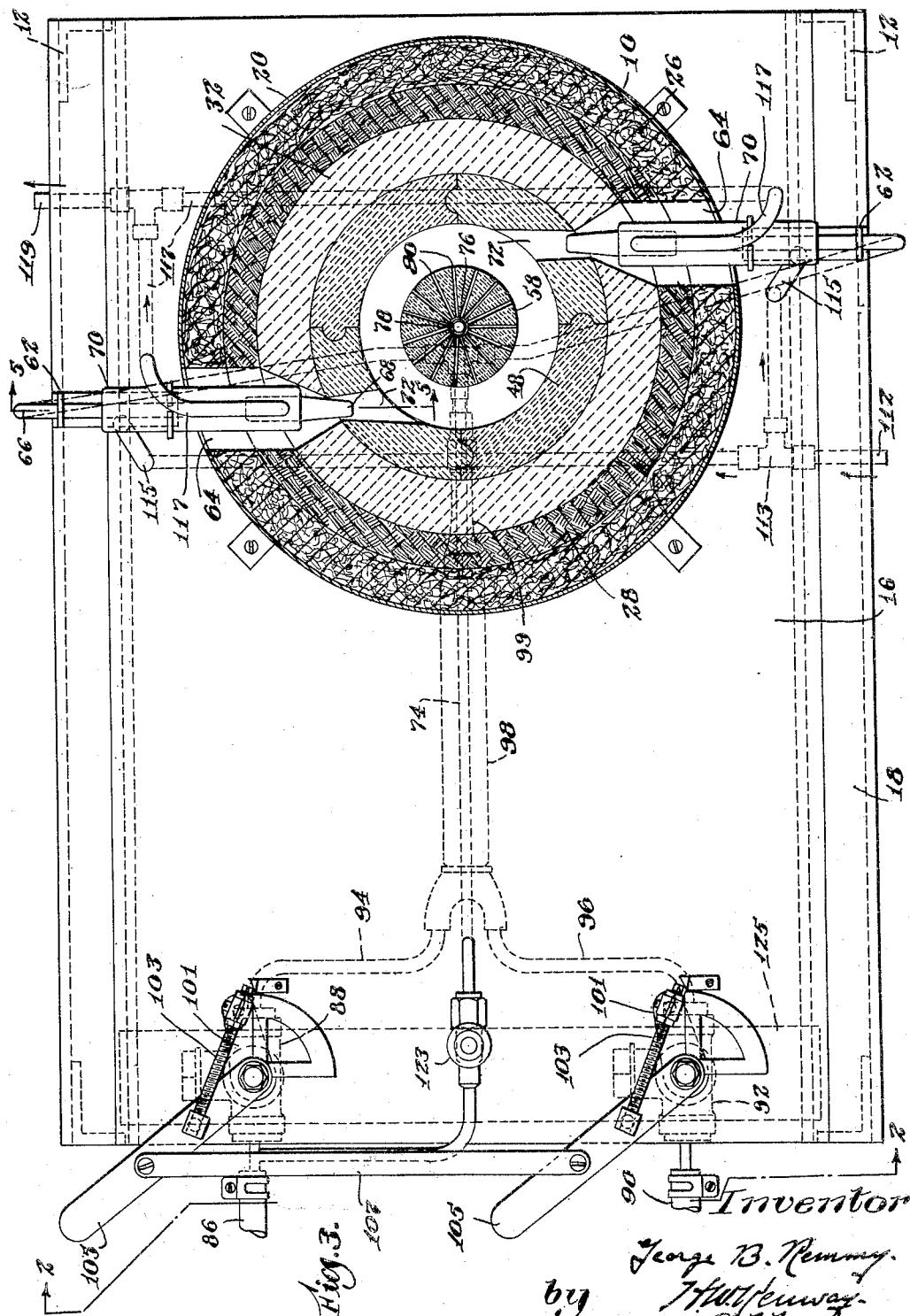
Fig. 3 is a plan sectional view taken on line 3—3 of Fig. 4.

While my invention concerns a high temperature furnace particularly adapted to the making of melting tests, it will, of course, be clear that it may be conveniently used for other desired purposes, such as the melting of metal in small crucibles. Furthermore, while I have developed the invention particularly for the purpose of providing a convenient portable unit, it will be understood that the invention is not limited to such construction and that certain features thereof are equally applicable to larger furnaces. I will now proceed to describe the invention as illustrated in the accompanying drawings and while in such description I shall generally indicate certain dimensions which I have used in constructing my portable furnace, it will be understood that I have no intention of limiting the invention thereto except as defined in the appended claims.

The furnace proper 10 with its supporting base and fuel controls is built upon a metal frame 12. The supporting base comprises a sheet 14 of ½″ corrugated asbestos board covered with a plain ¼″ asbestos board 16, both boards being firmly secured to the frame by bolts and side straps 18. The dimensions of the board 16 which I have used are 18 x 24″. The outer sheet iron shell 20 of the furnace is bolted to the base by means of flanges 22 attached thereto and in the portable furnace which I have constructed this shell is substantially 12″ in diameter.

The furnace within the shell 20 comprises an asbestos base 24 resting on the asbestos sheet 16 and an asbestos outer wall 26 directly adjacent to the shell 20 and resting on the base 24. Adjacent to the inner face of the wall 26 is a wall 28 of infusorial earth, this earth being a good insulating material and being able to withstand temperatures up to 2200° F. A relatively thick firebrick wall or base 30 is provided on top of the asbestos base 24 and a side wall 32 of similar thickness is provided adjacent to the inner face of the wall 28 and resting on the base wall 30. This wall 32 is of high grade firebrick material and is also high in heat insulating value. Resting on the walls 26, 28 and 32 is an asbestos ring 34 comprising a portion of the furnace top. The space within the ring is filled by a lid comprising an outer asbestos wall 36 to which is secured, as by bolts 38, a firebrick bottom 40. The lid may be lifted by means of knobs 42 and a downwardly disposed conical opening 44, hereinafter referred to, extends therethrough.

The inner lining of the furnace comprises a base wall 46 of corundum resting on the firebrick base 30 and supporting relatively thick side walls 48 of like material adjacent to the inner face of the wall 32. As shown in Fig. 3, the wall or walls 48 are made in four pieces joined together by rib and groove connections. The inner top portions of the walls 48 are stepped at 50 and resting thereon is an inner lid lining 52 having a central opening 54 in alignment with the lid opening 44. The walls 48 are supported on the base wall 46 outside a raised ring portion 56 thereof and within this ring and resting on the base 46 is a center post or block 58 of refractory material, such as zircon. This inner lining provides the fusing chamber 60 and the portion of the chamber above the top wall of the block 58 may be termed the "testing compartment" and that portion below such wall may be termed the "combustion compartment". The opening or openings 44, 54 serve as an exhaust and sight port.

The fuel is introduced into the furnace through a pair of burners supported on brackets 62 and the shell 20 and walls 26, 28 and 32 are cut through at 64 to receive these burners. Each burner comprises a gas feeding tube 66, a burner tip 68 on the inner end thereof, and a cooling water jacket 70. The two burners are located on opposite sides of the furnace and are arranged to direct the fuel tangentially into the chamber through openings 72 in two of the wall sections 48′ in alignment with the openings 64. The furnace is also arranged to provide secondary oxygen to the combustion chamber from a tubing 74. This tubing is connected to the lower end of a refractory tube 76 extending upwardly through the base walls 14, 16, 24, 30 and 46 and into communication with a central opening 78 in the block 58. The secondary oxygen is conducted from the opening 78 through holes 80 radiating outwardly through the block 58 to the combustion chamber.

As heretofore stated, I prefer to use oxygen and acetylene as the fuel for my furnace and in Fig. 1 I have illustrated an oxygen tank at 82 and an acetylene tank at 84, a hose 86 leading from the oxygen tank to an oxygen controlling valve 88 and a hose 90 leading from the acetylene tank to an acetylene controlling valve 92. Two tubes 94 and 96 lead from these valves into a mixing chamber 98 and the two burner tubes 66 are connected to the mixing chamber at 99. Each valve is operated by a lever 101 connected by an adjusting screw 103 to a loosely mounted handle 105 and these two handles are connected together by a link 107. The valves can, therefore, be independently adjusted to give the proper fuel mixture and when once adjusted this proportion is maintained by means of the synchronizing connection at 107.

Water from a faucet 109 is circulated through the cooling jackets 70 as follows. A hose 111 connects the faucet to a pipe 112 which branches at 113 and extends therefrom to the two jackets 70 at 115. Pipes 117 leading from the jackets conduct the water to an outlet at 119. This circulating water keeps the burners and tube 66 sufficiently cool to prevent any explosions in the feed pipes. The secondary oxygen tubing 74 is connected to the oxygen supply at 121 and its flow is controlled by means of a valve 123. The valve controls are mounted on the board 16 and the valves may be supported beneath the board on a shelf 125.

The construction, operation and advantages of my invention are believed to be quite obvious. The invention provides a portable testing unit which may be used with equally accurate results in varying locations and the oxy-acetylene fuel used is so standard that the same may be procured at reasonable prices in all localities. In adjusting the furnace for use, the valves 88 and 92 are set to give the proper fuel mixture and no further adjustment is thereafter necessary since their synchronous connection always maintains this proportion, the atmosphere within the furnace being thereby very definitely controlled. Any secondary oxygen necessary may be fed into the combustion chamber through the valve 123 and the connections therefrom, as described. Complete and substantial combustion takes place within the combustion chamber below the top surface of the block 58 and the temperature in all parts of the testing chamber above this top surface is always uniform. A considerable portion of this result is due to the tangential arrangement of the burner tips, which give a swirling and upward motion to the ignited gases between the block 58 and the wall 48, and this motion entirely equalizes the temperature throughout the testing chamber.

Access to the furnace is easy through the removal of the lid 36 and, furthermore, the top lining 52, sides 48 and base 46 may likewise be removed and replaced or repaired without disturbing any other part of the furnace. In performing a test, the test specimen is placed on the top surface of the block 58, whereby it is wholly within the testing chamber and removed from the combustion chamber. The operation may be observed through the sight and exhaust openings 44, 54. I have found that the use of my furnace permits tests at high temperature to be made very quickly and economically, a test to cone 32 being made at an expense less than $2.00. The furnace has been constructed to test up to and above 3600° F. and a cone 30 has been reached in 30 minutes. Furthermore, considerably higher temperatures are possible with my furnace if proper refractories can be secured for the furnace lining.

I desire to also call particular attention to the simplicity of my improved furnace, the operating instructions ordinarily being sufficient for its successful use by any laboratory apprentice. After once starting the furnace, the operator is substantially free to give his full time to observing the test. There need be no concern relative to backfires or explosions, regardless of furnace temperature, since the circulating water keeps the fuel pipes and burners below the exploding points. Furthermore, the construction of the furnace is such that its initial cost is low, as is also its cost of maintenance. The construction and simplicity of its operation also renders this type of furnace so uniform that all furnaces of the same design will operate uniformly and give uniform results.

Having thus described my invention, what I claim as new and desire to secure by Letters Patent is:

1. A fusion point test furnace, comprising a relatively thick fire-proof and heat-insulating exterior housing, relatively thick interior side and base walls of refractory material providing an interior fusion chamber, a refractory block centrally disposed within the chamber and adapted to support a test specimen, the space in the chamber above the block providing uniform testing conditions, means for projecting a high temperature fuel tangentially into the space between the chamber wall and block, and means including a pipe and valve for controlling and conducting a secondary oxygen supply into the last-named space to combine with the fuel.

2. A fusion point test furnace, comprising a relatively thick fire-proof and heat-insulating exterior housing, relatively thick interior walls of refractory material providing an interior fusion chamber, a refractory block centrally disposed within the chamber and adapted to support a test specimen, the space in the chamber above the block providing uniform testing conditions, means for projecting a high temperature fuel tangentially into the space between the chamber wall and block, and means including radially-extending ports in the block for conducting a secondary oxygen supply into the last-named space to combine with the fuel.

3. A fusion point test furnace, comprising a relatively thick fire-proof and heat-insulating exterior housing, relatively thick interior walls of refractory material providing an interior fusion chamber, a refractory block centrally disposed within the chamber and adapted to support a test specimen, the space in the chamber above the block providing uniform testing conditions, means for projecting a high temperature fuel tangentially into the space between the chamber wall and block, and means providing a passage through the base walls beneath the block and in communication with a plurality of ports in the block leading into the last-named space whereby to conduct a secondary oxygen supply into said last-named space to combine with the fuel.

4. A fusion point test furnace, comprising a relatively thick housing of heat-insulating material, relatively thick interior side and base walls of refractory material providing a substantially closed interior fusion chamber and including a top wall having a relatively small opening into the chamber, means providing a relatively thick heat-insulating exterior housing over the top wall and having an opening therethrough in alignment with the top wall opening, the portion of the exterior housing and interior walls embodying said openings being within the side walls and beneath the top surface thereof and being removable to permit access to the chamber, a refractory block centrally disposed within the chamber and adapted to support a test specimen, the space in the chamber above the block providing uniform testing conditions, and means for projecting a high temperature fuel tangentially into the space between the chamber wall and block.

5. A fusion point test furnace, comprising a relatively thick fire-proof and heat-insulating exterior housing, relatively thick interior walls of refractory material providing an interior fusion chamber and including a top wall having a relatively small opening therethrough into the chamber, a relatively thick removable lid having an opening therethrough in alignment with the top wall opening, said top wall being within the side walls of the furnace and beneath the top surface thereof, a refractory block centrally disposed within the chamber and adapted to support a test specimen, the space in the chamber above the block being subject to uniform testing conditions, and means for projecting a high temperature fuel tangentially into the space between the chamber wall and block.

6. A fusion point test furnace, comprising a relatively thick fire-proof and heat-insulating exterior housing, relatively thick interior walls of refractory material providing an interior fusion chamber and including a chamber-lining top wall resting on the interior side walls and having a relatively small opening therethrough, a relatively thick removable lid over said top wall and having an opening in alignment with the top wall opening, a refractory block centrally disposed within the chamber and adapted to support a test specimen on its top surface, the top wall being removable through the space occupied by the lid and the space in the chamber above the block providing uniform testing conditions, and means for projecting a high temperature fuel tangentially into the space between the chamber wall and block.

7. A fusion point test furnace, comprising a relatively thick fire-proof and heat insulating exterior housing, relatively thick interior side and base walls of refractory material providing a substantially closed interior fusion chamber, a refractory block centrally disposed within the chamber and adapted to support a test specimen, the space in the chamber above the block providing uniform testing conditions, synchronized acetylene and oxygen controlling valves, means including connections therefrom for projecting a balanced oxy-acetylene fuel tangentially into the space between the chamber wall and block, and manually controlled means for conducting a desired secondary oxygen supply into the last-named space to combine with the fuel.

8. A fusion point test furnace, comprising an exterior housing including exterior side and base walls of asbestos and inner walls of heat-resisting and insulating material, relatively thick interior walls of refractory material providing an interior fusion chamber and including a top wall within the side walls and beneath the top surface thereof and having an opening therethrough into the chamber, a relatively thick lid having an opening in alignment with the top wall opening, the lid and top wall being removable, a refractory block centrally disposed within the chamber and adapted to support a test specimen, the space in the chamber above the block providing uniform testing conditions, and means for projecting a high temperature fuel tangentially into the space between the chamber wall and block.

9. A fusion point test furnace, comprising a relatively thick fire-proof base including a sheet of corrugated asbestos board, a housing thereon having relatively thick base and side walls of fire-proof and heat-insulating material, relatively thick interior walls of refractory material within the housing and providing an interior fusion chamber therein, a refractory block centrally disposed within the chamber and adapted to support a test specimen, the space in the chamber above the block providing uniform testing conditions, means for projecting a high temperature fuel tangentially into the space between the chamber wall and block, and means on the base for controlling the flow of fuel.

10. A fusion point test furnace, comprising a relatively thick fire-proof base including a flat sheet of asbestos board supported on a sheet of corrugated asbestos board, a housing thereon having relatively thick base and side walls of fire-proof and heat-insulating material, the base wall of which includes a relatively thick layer of asbestos resting on said flat asbestos board, relatively thick interior walls of refractory material providing an interior fusion chamber providing uniform testing conditions, means for projecting a high temperature fuel tangentially into the chamber adjacent to its wall, and means on the base for controlling the flow of fuel.

11. A fusion point test furnace, comprising a relatively thick fire-proof base including a flat sheet of asbestos board supported on a sheet of corrugated asbestos board, a housing thereon having relatively thick base and side walls of fire-proof and heat-insulating material, the base wall of which includes a relatively thick layer of asbestos resting on said flat asbestos board, relatively thick interior walls of refractory material providing an interior fusion chamber providing uniform testing conditions, and a pair of fuel projecting members extending through the housing and pointing tangentially into the chamber, the said interior walls having openings in alignment with the members and through which the fuel is projected into the chamber.

GEORGE BICKLEY REMMEY.